(12) United States Patent
Liu et al.

(10) Patent No.: US 10,101,520 B2
(45) Date of Patent: Oct. 16, 2018

(54) LIGHT CONVERSION FILM AND PREPARATION METHOD THEREOF, AND LIQUID CRYSTAL DISPLAY DEVICE

(71) Applicants: HISENSE ELECTRIC CO., LTD., Shandong (CN); HISENSE USA CORP., Suwanee, GA (US); HISENSE INTERNATIONAL CO., LTD., Shandong (CN)

(72) Inventors: Xuhai Liu, Shandong (CN); Jianwei Cao, Shandong (CN); Shunming Huang, Shandong (CN); Fulin Li, Shandong (CN)

(73) Assignees: HISENSE ELECTRIC CO., LTD., Shandong (CN); HISENSE USA CORPORATION, Suwanee, GA (US); HISENSE INTERNATIONAL CO., LTD., Shandong (CN)

( * ) Notice: Subject to any disclaimer, the term of this patent is extended or adjusted under 35 U.S.C. 154(b) by 0 days.

(21) Appl. No.: 15/090,038

(22) Filed: Apr. 4, 2016

(65) Prior Publication Data

US 2017/0038512 A1 Feb. 9, 2017

(30) Foreign Application Priority Data

Aug. 6, 2015 (CN) .......................... 2015 1 0478078

(51) Int. Cl.
*G02B 6/00* (2006.01)
*F21V 8/00* (2006.01)

(52) U.S. Cl.
CPC ........... *G02B 6/005* (2013.01); *G02B 6/0055* (2013.01)

(58) Field of Classification Search
CPC .............................. G02B 6/005; G02B 6/0055
USPC ............................................................. 349/61
See application file for complete search history.

(56) References Cited

U.S. PATENT DOCUMENTS

| 2005/0244863 | A1 | 11/2005 | Mir | |
|---|---|---|---|---|
| 2006/0157686 | A1* | 7/2006 | Jang | ...................... B82Y 10/00 257/14 |
| 2006/0246467 | A1 | 11/2006 | Wade et al. | |

(Continued)

FOREIGN PATENT DOCUMENTS

| CN | 1725438 A | 1/2006 |
|---|---|---|
| CN | 102431964 A | 5/2012 |

(Continued)

OTHER PUBLICATIONS

Office Action issued in corresponding Chinese Patent Application No. 201510478078.9, dated Aug. 17, 2017.

(Continued)

*Primary Examiner* — Christopher Raabe
(74) *Attorney, Agent, or Firm* — McDermott Will & Emery LLP (57) ABSTRACT

The present disclosure provides a light conversion film and a preparation method thereof, and a liquid crystal display device. The light conversion film comprises a first substrate, a thin film layer, a quantum dot layer in which quantum dots are distributed, and a second substrate, which are all successively stacked, wherein said thin film layer is a transparent sheet having an electric field on a surface thereof, and said quantum dots are orderly arrayed due to said electric field.

20 Claims, 7 Drawing Sheets

(56) References Cited

U.S. PATENT DOCUMENTS

| | | | | |
|---|---|---|---|---|
| 2007/0105307 | A1* | 5/2007 | Jeng | B82Y 10/00 |
| | | | | 438/257 |
| 2007/0127164 | A1 | 6/2007 | Ofek et al. | |
| 2013/0215645 | A1* | 8/2013 | Jang | G02B 6/0011 |
| | | | | 362/608 |
| 2016/0054624 | A1* | 2/2016 | Cho | G02F 1/133605 |
| | | | | 349/58 |
| 2016/0091649 | A1* | 3/2016 | Uchiumi | G02B 6/005 |
| | | | | 349/61 |
| 2016/0091650 | A1* | 3/2016 | Uchiumi | G02B 6/0065 |
| | | | | 349/61 |
| 2017/0138567 | A1* | 5/2017 | Yoon | F21V 9/16 |

FOREIGN PATENT DOCUMENTS

| | | |
|---|---|---|
| CN | 103151412 A | 6/2013 |
| CN | 103256565 A | 8/2013 |
| CN | 104445235 A | 3/2015 |
| CN | 204439978 U | 7/2015 |

OTHER PUBLICATIONS

Doctoral Dissertation, Engineering Science and Technology, vol. 1, Issue 12, Dec. 2014 (Partial English translation discussed in Office Action issued in corresponding Chinese Patent Application No. 201510478078.9, dated Jun. 26, 2018).

Office Action issued in corresponding Chinese Patent Application No. 201510478078.9, dated Jun. 26, 2018.

* cited by examiner

| Attach a thin film layer on a surface of a first substrate, said thin film layer being a transparent sheet having an electric field on the surface thereof | 201 |

| Coat quantum dot material on said thin film layer to form a quantum dot layer in which quantum dots are distributed, said quantum dots being orderly arrayed due to said electric field | 202 |

| Adhere a second substrate on a surface of said quantum dot layer | 203 |

LIGHT CONVERSION FILM AND PREPARATION METHOD THEREOF, AND LIQUID CRYSTAL DISPLAY DEVICE

CROSS REFERENCE OF RELEVANT APPLICATIONS

The present application claims the benefit and priority of the Chinese Patent Application No. 201510478078.9 submitted on Aug. 6, 2015, titled "LIGHT CONVERSION FILM AND PREPARATION METHOD THEREOF, AND LIQUID CRYSTAL DISPLAY MODULE", which is incorporated herein by reference in its entirety.

FIELD OF TECHNOLOGY

The present disclosure relates to the field of display, in particular to a light conversion film and a preparation method thereof, and a liquid crystal display device.

BACKGROUND

Quantum dots, also called nanocrystallines, are nanoparticles composed of II-VI or III-V elements. The particle size of quantum dots is generally 1 nm to 10 nm. Since electrons and holes are quantum confined, the continuous energy band structure becomes a discrete energy level structure having molecular properties, which may emit fluorescent light when excited. Hence, quantum dots are widely applied in the field of display. For a structure layer in which quantum dots are distributed, i.e., a quantum dot layer, when excited by a light source, quantum dots distributed in the quantum dot layer may emit light of different chromaticity.

SUMMARY OF THE DISCLOSURE

The first aspect of the present disclosure provides a light conversion film, comprising: a first substrate, a thin film layer, a quantum dot layer in which quantum dots are distributed, and a second substrate, which are all successively stacked, wherein said thin film layer is a transparent sheet having an electric field on a surface thereof, and said quantum dots are orderly arrayed due to said electric field.

The second aspect of the present disclosure provides a method for preparing a light conversion film, comprising: attaching a thin film layer on a surface of a first substrate, said thin film layer being a transparent sheet having an electric field on a surface thereof; coating quantum dot material on said thin film layer to form a quantum dot layer in which quantum dots are distributed, said quantum dots being orderly arrayed due to said electric field; and successively adhering a first water-oxygen isolating layer and a second substrate on a surface of said quantum dot layer.

The third aspect of the present disclosure provides a liquid crystal display device, comprising a liquid crystal display module comprising a liquid crystal panel, said light conversion film as described above and a light source, which are all successively stacked, wherein said light conversion film comprises a first substrate, a thin film layer, a quantum dot layer in which quantum dots are distributed, and a second substrate, which are all successively stacked; wherein said thin film layer is a transparent sheet having an electric field on a surface thereof, and said quantum dots are orderly arrayed due to said electric field; and wherein said light conversion film is located between said liquid crystal panel and said light source, and a distance from said thin film layer to said light source is less than a distance from said quantum dot layer to said light source.

DETAILED DESCRIPTION OF THE PREFERRED EMBODIMENTS

To make the objectives, technical solutions and advantages of the embodiments of the present disclosure more clear, the technical solutions of the embodiments of the present disclosure will be clearly and completely described below referring to the accompanying drawings in the embodiments of the present disclosure.

Figure 1A:
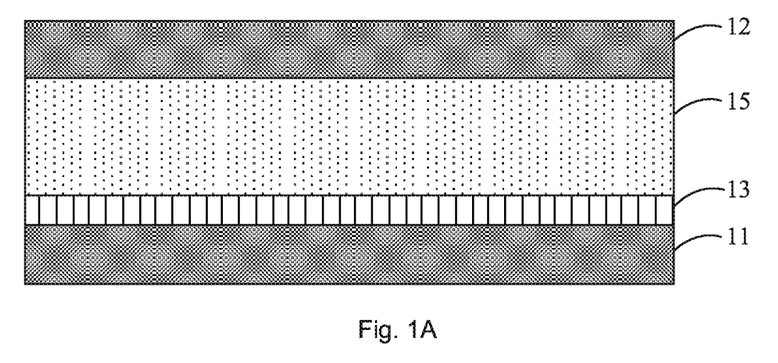
FIG. 1A is a schematic structure diagram of a light conversion film according to Embodiment 1 of the present disclosure.

FIG. 1A is a schematic structure diagram of a light conversion film according to Embodiment 1 of the present disclosure. As shown in FIG. 1A, the light conversion film includes:

a first substrate 11, a thin film layer 13, a quantum dot layer 15 in which quantum dots are distributed, and a second substrate 12, which are all successively stacked, wherein the quantum dot layer 15 is located between the thin film layer 13 and the second substrate 12, wherein the thin film layer 13 is a transparent sheet having an electric field on a surface thereof, and said quantum dots are orderly arrayed due to said electric field.

Further, the thin film layer may have charged ions on one side so that an electric field is formed on one side of the thin film layer, and the side of the thin film layer having charges faces the quantum dot layer.

The material of the first substrate 11 and the second substrate 12 may be polyethylene terephthalate (PET) or polycarbonate (PC). Specifically, the substrates may be used as carriers for preparing the light conversion film, and the substrates can protect the internal structure of the light conversion film due to their usually stable structures and properties and thus improve the reliability and service life of products.

At present, light conversion films have been widely applied in the field of display, particularly high color gamut display. Specifically, an existing light conversion film has the following structure: two water-oxygen isolating layers are stacked between two stacked substrates, a quantum dot layer is arranged between the two water-oxygen isolating layers, and quantum dots are distributed in the quantum dot layer. Specifically, the preparation of the quantum dot layer may be achieved by various processes, for example, a quantum dot layer may be prepared and formed by coating quantum dot material. Said quantum dot material is made by mixing quantum dots and a solvent. In a practical process, the quantum dot material is prepared and formed by dispersing and mixing quantum dots in a solvent, and the quantum dot layer is prepared by coating the quantum dot material. The solvent may be transparent polymeric material, such as PET or polycarbonate (PC). Specifically, the preparation of the quantum dot layer may be achieved by various processes, and is not limited in this embodiment.

Quantum dots, as semiconductor nanocrystallines invisible to the eyes, have a diameter of about 2 microns to 10 microns and are generally composed of zinc atoms, cadmium atoms, sulphur atoms, selenium atoms and other atoms. When excited by light, quantum dots will emit colorful light rays, and the color of light rays depends upon the material, size and shape of quantum dots. In this embodiment, the quantum dots in the quantum dot layer may include at least two types of quantum dots of different sizes, for example, red quantum dots and green quantum dots.

Specifically, a quantum dot has three parts from inside to outside: a core, a shell and ligands. Ligands are small organic molecules having a polarity. Hence, with the ligands, the quantum dots will be more orderly arrayed due to the electric field, so that the directionality of the outgoing light is more concentrated and the light conversion efficiency is improved.

The material for preparing the thin film layer 13 may be selected according to actual requirements. For example, the thin film layer 13 may be made of muscovite sheets, potassium chloride sheets or phlogopite sheets.

The muscovite, potassium chloride or phlogopite may have functions of water-oxygen isolating and high-temperature resistance since they exhibits excellent thermal insulating effect and waterproof effect. Consequently, on the basis of ensuring the light conversion efficiency, the light conversion film is brought to be closer to the light source. Further, a more compact display product may be prepared, and the service life of the product may be improved.

Preferably, said first substrate and said second substrate may be made of PET material, the molecular chains of which may be bound to the molecular chains of muscovite better so that the structure of the light conversion film becomes more stable.

Optionally, in order to improve the mechanical performance of the light conversion film, the thin film layer 13 may be a flexible thin film layer. Further, the thickness of the thin film layer 13 may be kept at micron-level, for example, may be 1 micron to 10 microns, such as 1 micron, 3 microns, 5 microns, or, may be less than 1 micron, such as 0.8 micron, 0.5 micron. Specifically, a thin film layer having a micron-level thickness may have excellent mechanical performance, transparency and flexibility, so that the mechanical performance, transparency and flexibility of the light conversion film are improved. In a practical process, a thin film layer may be prepared by a slicing or lift-off process. In this way, a thin film layer having a flat surface and showing good condition is obtained, and the performance of the light conversion film is further improved.

In order to better understand this technical solution, description will be given by taking muscovite as an example. The chemical formula of muscovite is $KAl_2AlSi_3O_{10}(OH)_2$. Large-size muscovite sheets may be obtained by a slicing or lift-off process, and the thickness of the sheets may be less than 1 micron. Hence, those sheets have excellent mechanical performance and transparency and good flexibility.

Figure 1B:
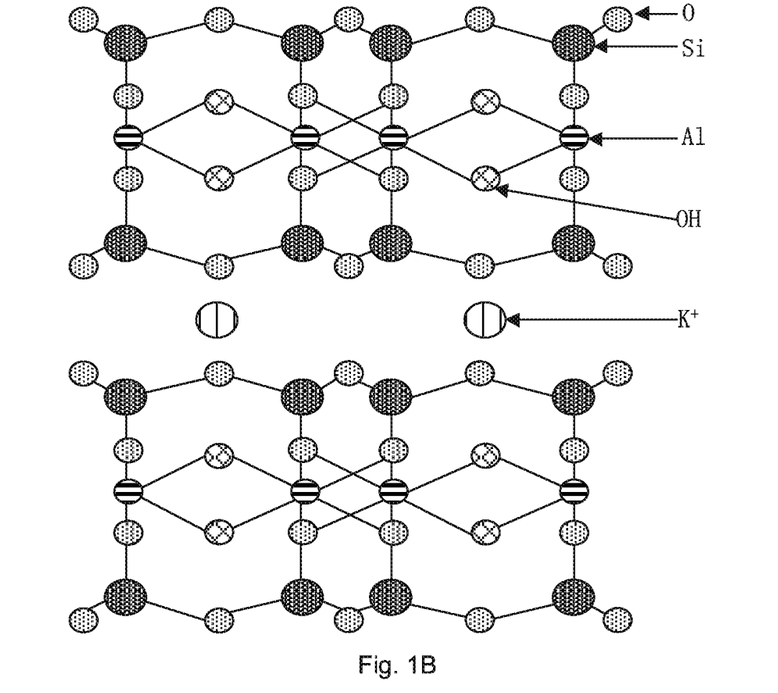
FIG. 1B is a schematic diagram of the molecular structure of muscovite.

FIG. 1B is a schematic diagram of the molecular structure of muscovite. As shown in FIG. 1B, muscovite is in a layered stack structure in which each large layer (i.e., "TOT" layer) consists of two small layers of tetrahedral Al and Si (i.e., small layers "T") and octahedral O (i.e., small layer "O") sandwiched between the two small layers "T". The small layers form a large layer since $Al^{3+}$ and $OH^-$ are bound together. The large layers are connected to each other by cation $K^+$. When muscovite is sliced or peeled-off, since muscovite is sliced or peeled-off along $K^+$ in a plane, the exposed internal surface layer thereof will show a positive electric field because of $K^+$. This electric field may enable the nano-structure on the surface of muscovite to be more orderly, that is, may enable the quantum dots to be more orderly arrayed, so that the directionality of the outgoing light is more concentrated and the light conversion efficiency is improved. Preferably, the internal surface layer having $K^+$ faces the quantum dot layer.

Furthermore, the muscovite sheet itself may have the same effect as the water-oxygen isolating layer, and may effectively insulate the temperature and have excellent high-temperature resistance performance. Hence, compared with the existing light conversion film structures, the muscovite sheet may substitute one of the water-oxygen isolating layers. In this case, one water-oxygen isolating layer may be omitted, so that the light conversion efficiency is improved without additionally increasing the cost.

In addition, when the light conversion film is applied in the application scene of the display module, the distance between the light conversion film and the light source may be effectively reduced and the size of the entire display module may be reduced, since the muscovite sheets have excellent high-temperature resistance performance.

Figure 1C:
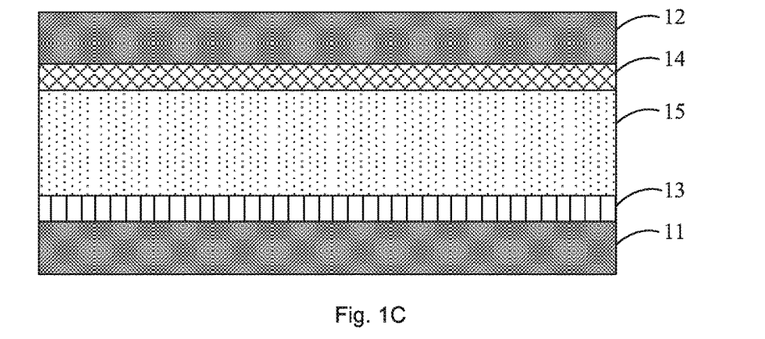
FIG. 1C is a schematic structure diagram of another light conversion film according to Embodiment 1 of the present disclosure.

Optionally, in order to further protect the quantum dot layer 15, as shown in FIG. 1C which is a schematic structure diagram of another light conversion film according to Embodiment 1 of the present disclosure, on the basis of any previous implementation, said light conversion film further includes:

a first water-oxygen isolating layer 14 located between the quantum dot layer 15 and the second substrate 12.

The first water-oxygen isolating layer 14 may be made of material having a water-oxygen isolating function and having excellent heat dissipation performance, for example, silicon dioxide, silicon nitrogen or the like.

In a practical application, the light conversion film may be applied in a liquid crystal display module. Specifically, the light conversion film may be arranged in a light source and a liquid crystal panel in such a way that the thin film layer 13 is closer to the light source while the first water-oxygen isolating layer 14 is far away from the light source. Such an arrangement can allow the thin film layer 13 to better block heat energy from the light source so as to protect the quantum dot layer 15, and can allow the first water-oxygen isolating layer 14 to quickly transfer heat energy generated by the quantum dot layer 15 outside. In this way, the reliability of the light conversion film is improved, and the service life thereof is prolonged.

In addition, the light conversion film may be applied in other fields requiring light conversion, for example, the light-emitting LED field. Specifically, in order to improve the light conversion efficiency of LEDs, the light conversion film wraps the light source on its surface. The specific appearance shape of the light conversion film layer is not limited in this embodiment.

Furthermore, in this embodiment, by preparing a quantum dot layer on a thin film layer having an electric field on a surface thereof, quantum dots in the quantum dot layer are more orderly arrayed due to the electric field on the surface of the thin film layer, so that the directionality of the outgoing light is more concentrated and the light conversion efficiency is effectively improved. In comparison with the prior art in which the display effect may be improved only by using a high energy consumption light source as a light source in a back-light module because of low light conversion efficiency caused by scattering of light due to the disorder arraying of quantum dots in the quantum dot layer, in this embodiment, with the electric field on the surface of the thin film layer, the light conversion efficiency is effectively improved, and hence excellent display effect may be achieved without using a high energy consumption light source and the energy consumption is thus effectively reduced.

Figure 1D:
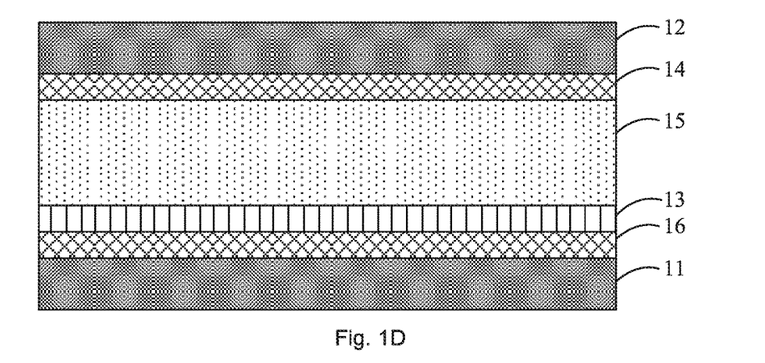
FIG. 1D is a schematic structure diagram of still another light conversion film according to Embodiment 1 of the present disclosure.

Optionally, in one possible implementation, on the basis of providing a thin film layer, a water-oxygen isolating layer may be additionally provided to realize better water-oxygen isolating effect. Correspondingly, as shown in FIG. 1D which is a schematic structure diagram of still another light conversion film according to Embodiment 1 of the present disclosure, on the basis of that as shown in FIG. 1C, the light conversion film further includes a second water-oxygen isolating layer 16; and the second water-oxygen isolating layer 16 is located between the thin film layer 13 and the first substrate 11.

The water-oxygen isolating layer may be made of any material having a water-oxygen isolating function, for example, silicon dioxide or the like.

Specifically, in some special application scenes, for example, high-humidity environments or other scenes having high water-oxygen isolating requirements, in order to prevent the quantum dot layer from being damaged, the light conversion film is required to have high water-oxygen isolating capability. Hence, in this implementation, on the basis of providing the thin film layer 13, a water-oxygen isolating layer is additionally provided between the substrate and the thin film layer to further improve the reliability of the light conversion film.

In the light conversion film as provided in this embodiment of the present disclosure, a quantum dot layer is superposed on a surface of a transparent thin film layer having an electric field on the surface thereof, in which a quantum dot has three parts from inside to outside, i.e., a core, a shell and ligands, and ligands are small organic molecules having a polarity. With the ligands having a polarity, the quantum dots will be more orderly arrayed due to the electric field. Hence, due to the electric field, the quantum dots in the quantum dot layer are orderly arrayed, so that the directionality of the outgoing light is more concentrated. The problem of low light conversion efficiency caused by scattering of light due to the radiation of light from the light source to the disordered quantum dots in the prior art is avoided, and the light conversion efficiency is improved.

Figure 2A:
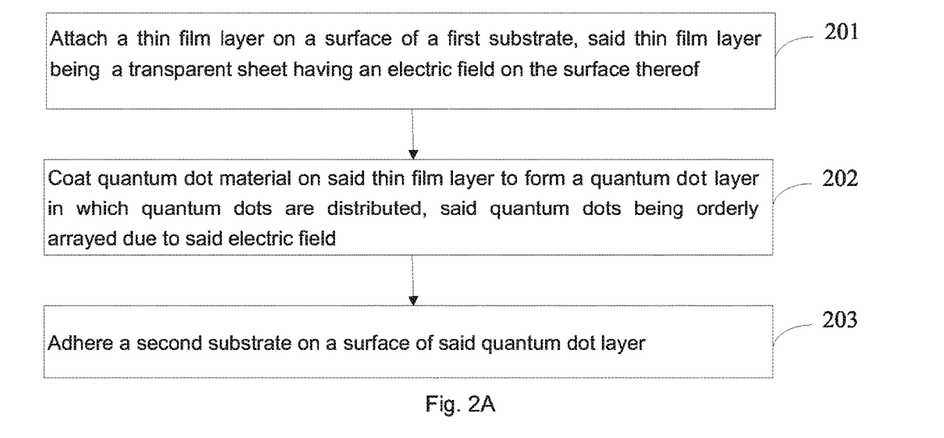
FIG. 2A is a schematic flowchart of a method for preparing a light conversion film according to Embodiment 2 of the present disclosure.

FIG. 2A is a schematic flowchart of a method for preparing a light conversion film according to Embodiment 2 of the present disclosure. This method may be used for preparing a light conversion film as described in Embodiment 1. As shown in FIG. 2A, the method includes:

step 201: attaching a thin film layer on a surface of a first substrate, said thin film layer being a transparent sheet having an electric field on the surface thereof;

step 202: coating quantum dot material on said thin film layer to form a quantum dot layer in which quantum dots are distributed, said quantum dots being orderly arrayed due to said electric field; and step 203: adhering a second substrate on a surface of said quantum dot layer.

The material of the first substrate and the second substrate may be polyethylene terephthalate (PET). Specifically, the substrates may be used as carriers for preparing a light conversion film, and the substrates can protect the internal structure of the light conversion film due to their usually stable structures and properties and thus improve the reliability and service life of products.

Said quantum dot material is made by mixing quantum dots and a solvent.

Specifically, before the quantum dot material is coated to form a quantum dot layer, a thin film layer having an electric field on a surface thereof is attached on a surface of a first substrate. With the electric field on the surface of the thin film layer, the quantum dots in the quantum dot layer are more orderly arrayed, so that the directionality of the outgoing light is more concentrated, and thus the conversion efficiency of the quantum dot film is improved and the water-oxygen isolating and high-temperature resistance performance thereof are improved. Preferably, on side of the thin film layer, there is an electric field generated due to charged ions, and the side of the thin film layer having the electric field faces the quantum dot layer.

The thin film layer may be selected according to actual requirements. For example, the thin film layer may be made of muscovite sheets, potassium chloride sheets or phlogopite sheets. Said quantum dot material may be specifically base material mixed with quantum dots. This base material may be transparent polymeric material, such as PET or PC.

Optionally, in order to improve the mechanical performance of the light conversion film, the thin film layer may also be a flexible thin film layer. Further, the thickness of the thin film layer may be kept at micron-level, for example, may be 1 micron. Specifically, a thin film layer having a micron-level thickness may have excellent mechanical performance, transparency and flexibility, so that the mechanical performance, transparency and flexibility of the light conversion film are improved. In a practical process, a thin film layer may be prepared by a slicing or lift-off process. In this way, a thin film layer having a flat surface and showing good condition is obtained, and the performance of the light conversion film is further improved.

Figure 2B:
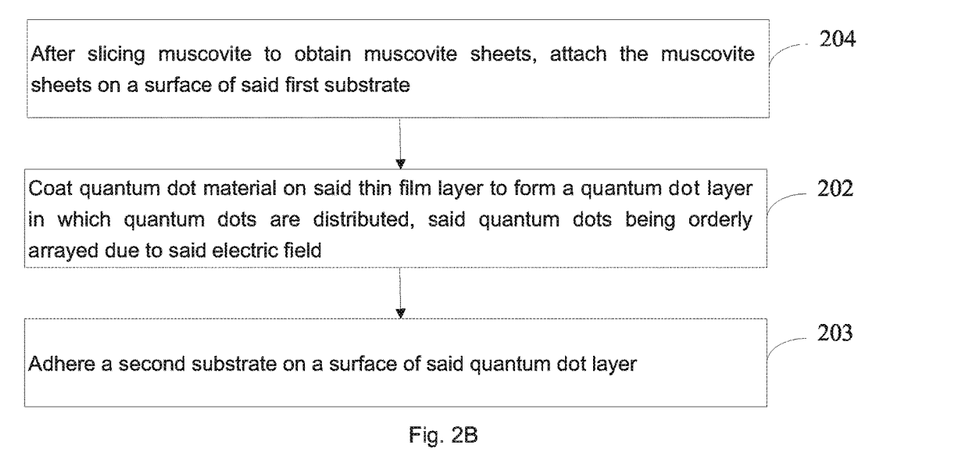
FIG. 2B is a schematic flowchart of another method for preparing a light conversion film according to Embodiment 2 of the present disclosure.

In order to better understand this technical solution, description will be given by taking muscovite as an example. The chemical formula of muscovite is $KAl_2AlSi_3O_{10}(OH)_2$. Large-size muscovite sheets may be obtained by a slicing or lift-off process, and the thickness of these sheets may be less than 1 micron. Hence, these sheets have excellent mechanical performance and transparency and good flexibility. Correspondingly, as shown in FIG. 2B which is a schematic flowchart of another method for preparing a light conversion film according to Embodiment 2 of the present disclosure, on the basis of that as shown in FIG. 2A, the thin film layer is made of muscovite sheets. Step 201 specifically includes:

step 204: after slicing muscovite to obtain muscovite sheets, attaching the muscovite sheets on a surface of said first substrate.

In this embodiment, the slicing direction of different material depends upon the molecular composition of this material. Slicing along a slicing direction may cut off the chemical bonds of this material so that an electric field is generated on the surface of the sliced material. Taking muscovite as an example, a plane of $K^+$ ions may be regarded as the slicing direction.

Specifically, during the preparation of the light conversion film, before coating the quantum dot material, the newly sliced transparent muscovite sheets, the thickness of which may be 1 micron, are attached on a substrate, for example, a PET substrate; and then a layer of quantum dot material, for example, red and green quantum dot material, i.e., a base material mixed with red quantum dots and green quantum dots, is coated on the muscovite sheets to form a quantum dot layer. The surface layer of the newly sliced muscovite has an electric field by which the nano-structure on this surface is orderly arrayed, and the orderly arraying of the quantum dots may significantly improve the efficiency of the device in the light energy conversion field. Finally, a water-oxygen isolating layer and a substrate are attached on the surface of the quantum dot layer.

For a newly sliced transparent muscovite sheet, the influence on $K^+$ ions from ionizing particles in air is small, and this facilitates better formation of an electric field. Thus, the quantum dots may be more orderly arrayed in the microstructure, the directionality of the outgoing light is more concentrated, and the light conversion efficiency of the quantum dot film is further improved. Furthermore, the excellent insulating and heat isolating performance of the transparent muscovite ultra-thin layer may improve the water-oxygen isolating and high-temperature resistance performance of the light conversion film.

In addition, the muscovite sheet itself may have the same effect as the water-oxygen isolating layer, and may effectively insulate the temperature and have excellent high-temperature resistance performance. Hence, compared with the existing light conversion film structures, the muscovite sheet may substitute one of the water-oxygen isolating layers. In this case, one water-oxygen isolating layer may be omitted, so that the light conversion efficiency is improved without additionally increasing the cost.

In the field of display modules, based on the existing light conversion films, the sensitivity of the quantum dots themselves against water-oxygen and working temperature impedes relative positions between components, for example, the light source and the quantum dots cannot get too close to each other. While based on the light conversion film of this embodiment, since the muscovite sheets have excellent high-temperature resistance performance, the distance between the light conversion film and the back-light module can be effectively reduced, and the size of the entire display module is thus reduced.

Figure 2C:
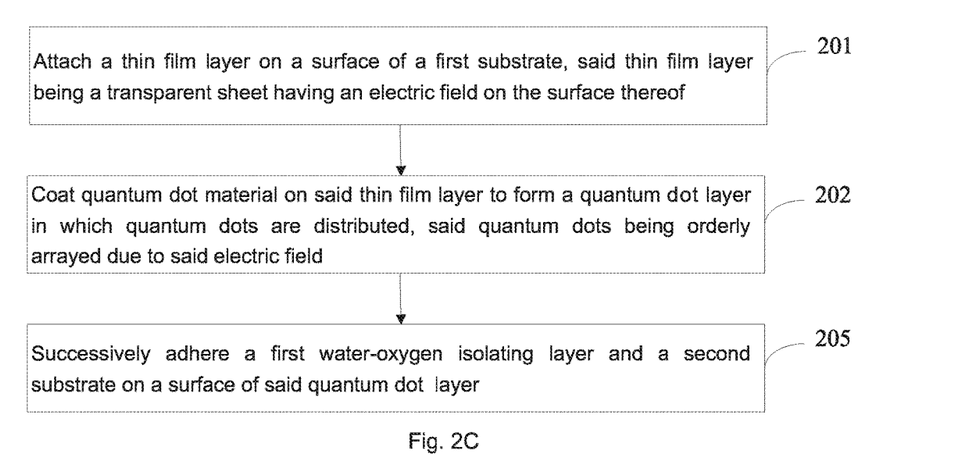
FIG. 2C is a schematic flowchart of still another method for preparing a light conversion film according to Embodiment 2 of the present disclosure.

Optionally, in order to further protect the quantum dot layer, as shown in FIG. 2C which is a schematic flowchart of still another method for preparing a light conversion film according to Embodiment 2 of the present disclosure, on the basis of any previous implementation, step 203 may specifically includes:

step 205: successively adhering a first water-oxygen isolating layer and said second substrate on a surface of said quantum dot layer.

The first water-oxygen isolating layer may be made of material having a water-oxygen isolating function and having excellent heat dissipation performance.

In a practical application, the light conversion film may be applied in a liquid crystal display module. Specifically, the light conversion film may be arranged in a light source and a liquid crystal panel in such a way that the thin film layer is closer to the light source while the first water-oxygen isolating layer is far away from the light source. Such an arrangement can allow the thin film layer to better block heat energy from the light source so as to protect the quantum dot layer, and can allow the first water-oxygen isolating layer to quickly transfer heat energy generated by the quantum dot layer outside. In this way, the reliability of the light conversion film is improved, and the service life thereof is prolonged.

Furthermore, in this embodiment, by preparing a quantum dot layer on a thin film layer having an electric field on a surface thereof, quantum dots in the quantum dot layer are more orderly arrayed due to the electric field on the surface of the thin film layer, so that the directionality of the outgoing light is more concentrated and the light conversion efficiency is effectively improved. In comparison with the prior art in which the display effect may be improved only by using a high energy consumption light source as a light source in a back-light module because of low light conversion efficiency caused by scattering of light due to the disorder arraying of quantum dots in the quantum dot layer, in this embodiment, with the electric field on the surface of the thin film layer, the light conversion efficiency is effectively improved, and hence excellent display effect may be achieved without using a high energy consumption light source and the energy consumption is thus effectively reduced.

Figure 2D:
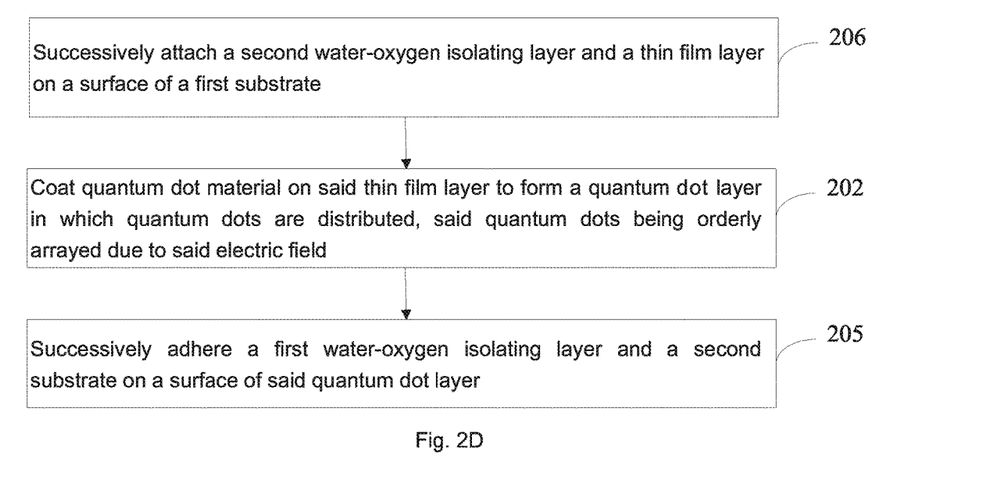
FIG. 2D is a schematic flowchart of yet another method for preparing a light conversion film according to Embodiment 2 of the present disclosure.

Optionally, in one possible implementation, on the basis of providing a thin film layer, a water-oxygen isolating layer may be additionally provided to realize better water-oxygen isolating effect. Correspondingly, as shown in FIG. 2D which is a schematic flowchart of still another method for preparing a light conversion film according to Embodiment 2 of the present disclosure, on the basis of that as shown in FIG. 2C, step 201 specifically includes:

step 206: successively attaching a second water-oxygen isolating layer and a thin film layer on a surface of a first substrate.

Specifically, in some special application scenes, for example, high-humidity environments or other scenes having high water-oxygen isolating requirements, in order to prevent the quantum dot layer from being damaged, the light conversion film is required to have high water-oxygen isolating capability. Hence, in this implementation, on the basis of providing the thin film layer 13, a water-oxygen isolating layer is additionally provided between the substrate and the thin film layer to further improve the reliability of the light conversion film.

In the method for preparing a light conversion film as provided in this embodiment of the present disclosure, before the quantum dot material is coated to form a quantum dot layer, a thin film layer having an electric field on a surface thereof is attached on a surface of a substrate. With the electric field on the surface of the thin film layer, the quantum dots in the quantum dot layer are more orderly arrayed, so that the directionality of the outgoing light is more concentrated. The problem of low light conversion efficiency caused by scattering of light due to the radiation of light from the light source to the disordered quantum dots in the prior art is avoided. Meanwhile, the thin film layer may have functions of water-oxygen isolating and high-temperature resistance. Consequently, on the basis of ensuring the light conversion efficiency, the light conversion film is brought to be closer to the back-light module. Further, a more compact display product may be prepared, and the service life of the product may be improved.

Figure 3A:
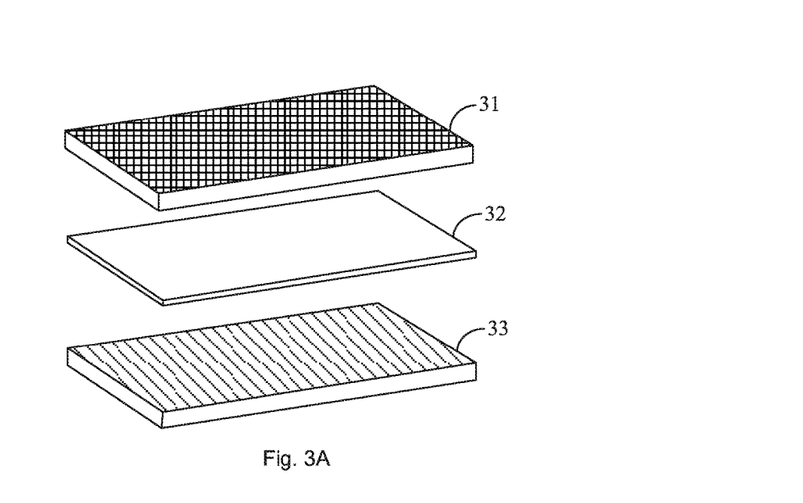
FIG. 3A is an exploded view of a liquid crystal display module according to Embodiment 3 of the present disclosure.
Figure 3B:
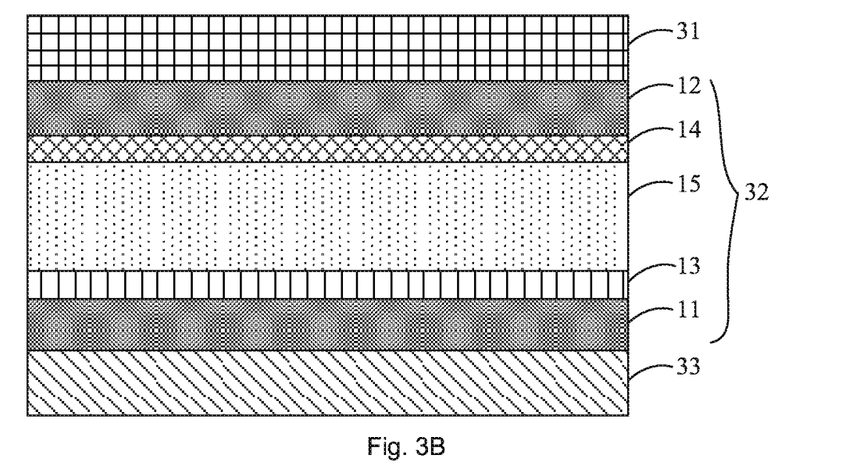
FIG. 3B is a schematic structure diagram of the liquid crystal display module according to Embodiment 3 of the present disclosure.

FIG. 3A is an exploded view of a liquid crystal display module according to Embodiment 3 of the present disclosure, and FIG. 3B is a schematic structure diagram of the liquid crystal display module according to Embodiment 3 of the present disclosure. As shown in FIG. 3A and FIG. 3B, the liquid crystal display module includes:

a liquid crystal panel 31, a light conversion film 32 of any embodiment as described above, and a light source 33, which are all successively stacked.

The light conversion film 32 is located between the liquid crystal panel 31 and the light source 33, and a distance from the thin film layer of the light conversion film 32 to the light source 33 is less than a distance from the first water-oxygen isolating layer of the light conversion film 32 to the light source 33.

Specifically, light emitted by the light source 33 is irradiated onto the light conversion film 32, and quantum dots in the light conversion film 32, when excited by light, emit light of different chromaticity, which is transferred by the liquid crystal panel 31 to the eyes of a user to achieve the display of an image.

In this embodiment, the thin film layer 13 of the light conversion film 32 has the same effect as the water-oxygen isolating layer, and may effectively insulate the temperature and have excellent high-temperature resistance performance. Hence, when the light conversion film 32 is arranged between the liquid crystal panel 31 and the light source 33, by arranging the thin film layer 13 close to the light source, high temperature from the light source 33 is isolated by the thin film layer 13, and the performance of the quantum dots in the quantum dot layer 15 is not interfered. In this way, the reliability of the light conversion film is improved and the service life thereof is prolonged.

Further, the material for preparing the thin film layer 13 may be selected according to actual requirements. For example, the thin film layer 13 may be made of muscovite sheets, potassium chloride sheets or phlogopite sheets. The muscovite, potassium chloride or phlogopite may have good functions of water-oxygen isolating and high-temperature resistance since they exhibits excellent thermal insulating effect and waterproof effect. That is, the thin film layer 13 has excellent high-temperature resistance performance. Hence, the distance between the light conversion film 32 and the light source 33 may be effectively reduced and the size of the entire liquid crystal display module may be reduced.

Optionally, the thin film layer 13 may also be a flexible thin film layer. Further, the thickness of the thin film layer 13 may be kept at micron-level, for example, may be 1 micron to 10 microns, such as 1 micron, 3 microns, 5 microns, or, may be less than 1 micron, such as 0.8 micron, 0.5 microns. Specifically, a thin film layer having a micron-level thickness may have excellent mechanical performance, transparency and flexibility, so that the mechanical performance, transparency and flexibility of the light conversion film are improved. In a practical process, a thin film layer may be prepared by a slicing or lift-off process. In this way, a thin film layer having a flat surface and showing good condition is obtained, and the performance of the light conversion film is further improved.

The light source 33 may have various structures, for example: side-type structure where the light source is arranged on the side face of the light guide plate, with characteristics of small weight, small thickness, narrow frame and low power consumption, applicable to small and medium sized equipment, for example, mobile phones, tablets, notebook computers or the like; direct or bottom-type structure where no light guide plate is included and the light source is placed directly bottom, and light is emitted by a self-emitting light source (for example, a lamp tube, an LED or the like) and then emitted towards a light outgoing surface after reflected by a reflecting plate, applicable to backlight modules of oversized equipment; hollow-type structure where air is regarded as a medium for transferring light, after being adjusted and reflected for directions by a prism and a reflecting plate, some of light passes through the light guide plate upward and is emergent from the surface and the other part of light enters a hollow cavity due to full reflection until being emergent from the light guide plate after being refracted and reflected, and the upward light directly enters the light guide plate to be emergent or is emergent by a series of refractions and reflections. The shape of the light guide plate is a wedge structure to achieve the effect of normalization.

Figure 3C:
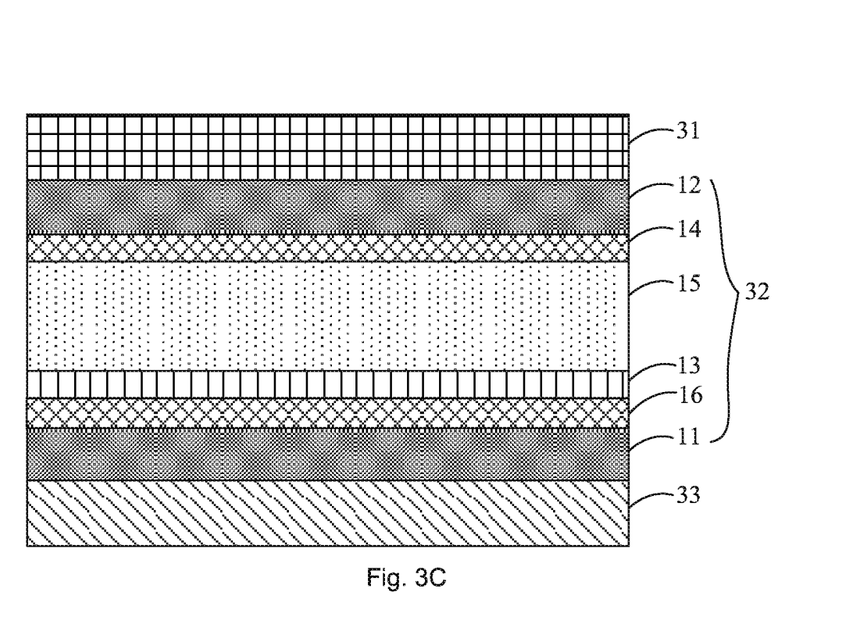
FIG. 3C is a schematic structure diagram of another liquid crystal display module according to Embodiment 3 of the present disclosure.

Optionally, as shown in FIG. 3C which is a schematic structure diagram of another liquid crystal display module according to Embodiment 3 of the present disclosure, on the basis of that as shown in FIG. 3B, the light conversion film further includes a second water-oxygen isolating layer 16; and the second water-oxygen isolating layer 16 is located between the thin film layer 13 and the first substrate 11. The water-oxygen isolating layer may be made of any material having a water-oxygen isolating function, for example, silicon dioxide or the like.

Figure 3D:
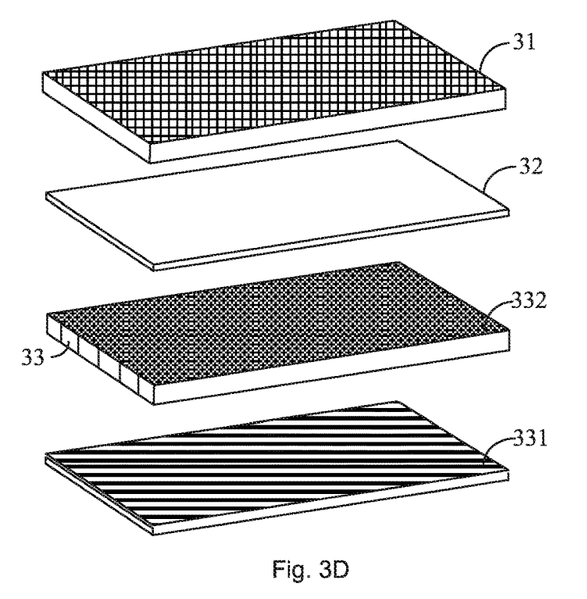
FIG. 3D is an exploded view of another liquid crystal display module according to Embodiment 3 of the present disclosure.

Optionally, as shown in FIG. 3D which is an exploded view of another liquid crystal display module according to Embodiment 3 of the present disclosure, on the basis of that as shown in FIG. 3A or FIG. 3B, the liquid crystal display module further includes:

a reflecting plate 331 and a light guide plate 332 which are stacked, wherein a light source 33 is arranged on a side face of the light guide plate 332, and a distance from the light guide plate 332 to the light conversion film 32 is less than a distance from the reflecting plate 331 to the light conversion film 32.

Specifically, the light source 33 is arranged on the side face of the light guide plate 332, i.e., light incoming side. The light conversion film 32 is arranged on a surface of the light guide plate 332, i.e., light outgoing surface, and the reflecting plate 331 is arranged on the other surface of the light guide plate. Light emitted by the light source 33 enters the light guide plate 332 from the light incoming side, some of light is irradiated onto the light conversion film 32 from the light outgoing surface of the light guide plate 332, and the other part of light is reflected by the reflecting plate 331 onto the light outgoing surface of the light guide plate 332 to be irradiated onto the light conversion film 32. Light emitted by a light source is emergent from the light outgoing surface of the light guide plate, which can provide uniform light to the light conversion film. By the reflecting plate, the irradiation of light onto the light conversion film may be increased to the largest extent. The loss of light is avoided, and the light conversion efficiency is thus improved.

The light source may be determined according to the actual requirements. For example, the light source 33 may be a plurality of blue light LEDs arranged on a side face of the light guide plate 332. Specifically, for the light conversion film 32, by preparing a quantum dot layer on a thin film layer having an electric field on a surface thereof, quantum dots in the quantum dot layer are more orderly arrayed due to the electric field on the surface of the thin film layer, so that the directionality of the outgoing light is more concentrated and the light conversion efficiency is effectively improved, and hence excellent display effect may be achieved without using a high energy consumption light source and the energy consumption is thus effectively reduced.

Figure 3E:
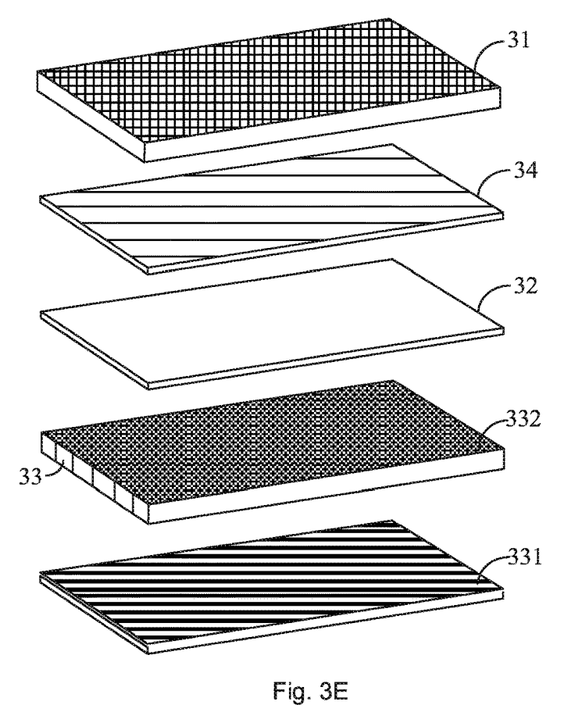
FIG. 3E is an exploded view of still another liquid crystal display module according to Embodiment 3 of the present disclosure.

In a practical application, in order to better improve the display effect, usually, a brightness enhancement film is further arranged below the liquid crystal panel. Corresponding, as shown in FIG. 3E which is an exploded view of still another liquid crystal display module according to Embodiment 3 of the present disclosure, on the basis of any previous implementation, the liquid crystal display module further includes:

a brightness enhancement film 34 arranged between the liquid crystal panel 31 and the light conversion film 32.

Correspondingly, the brightness enhancement film may improve the light-emitting efficiency of the display module. Specifically, the type of the brightness enhancement film may be selected according to actual requirements, mainly including common prisms, multi-functional prisms, reflecting polarizers or the like.

Further, the number of brightness enhancement films may also be determined according to actual requirements. For example, one or more brightness enhancement films may be arranged between the liquid crystal panel and the light conversion film, and the type of each brightness enhancement film may be the same or different. For example, two brightness enhancement films may be arranged between the liquid crystal panel and the light conversion film, including a primarily stacked brightness enhancement film (BEF) and a dual brightness enhancement film (DBEF).

In the light conversion film of the liquid crystal display module as provided in this embodiment of the present disclosure, a quantum dot layer is superposed on a surface of a transparent thin film layer having an electric field on a surface thereof. Due to the electric field, the quantum dots in the quantum dot layer are more orderly arrayed, so that the directionality of the outgoing light is more concentrated. The problem of low light conversion efficiency caused by scattering of light due to the radiation of light from the light source to the disorder quantum dots in the prior art is avoided. Meanwhile, the thin film layer may have functions of water-oxygen isolating and high-temperature resistance. Consequently, on the basis of ensuring the light conversion efficiency, the light conversion film is brought to be closer to the back-light module. Further, a more compact liquid crystal display module may be prepared, and the service life of the liquid crystal display module may be improved.

Figure 4:
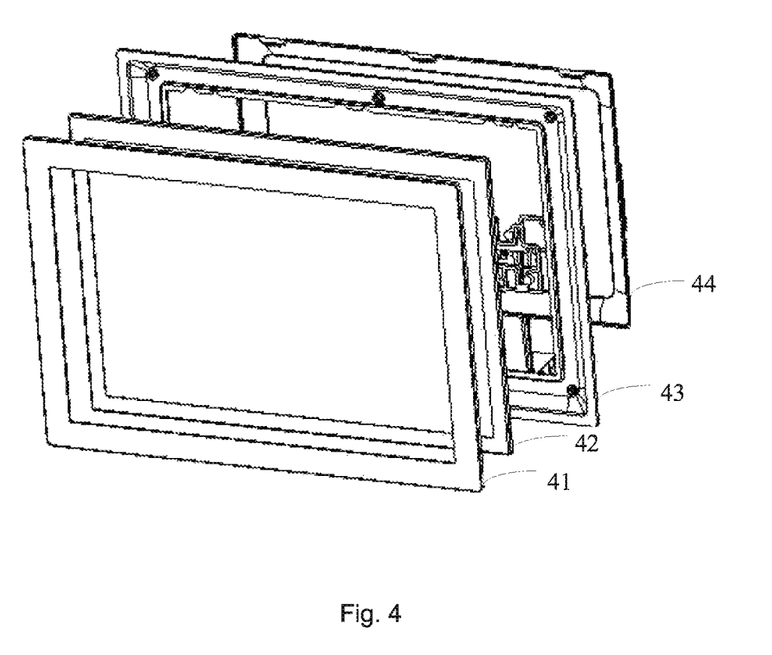
FIG. 4 is a schematic structure diagram of a liquid crystal display device according to Embodiment 4 of the present disclosure.

FIG. 4 is a schematic structure diagram of a liquid crystal display device according to Embodiment 4 of the present disclosure. As shown in FIG. 4, said display device includes a front frame 41, a liquid crystal display module 42 of any embodiment as described above, a middle frame 43 and a rear shell 44, wherein the front frame 41, the middle frame 43 and the rear shell 44 encapsulate, secure and support the liquid crystal display module 42.

Specifically, in a practical application, a similar display device may be, for example, a TV set, a computer, a mobile phone or the like.

In the liquid crystal display module of the liquid crystal display device as provided in this embodiment of the present disclosure, in the light conversion film of this liquid crystal display module, a quantum dot layer is superposed on a surface of a transparent thin film layer having an electric field on a surface thereof. Due to the electric field, the quantum dots in the quantum dot layer are more orderly arrayed, so that the directionality of the outgoing light is more concentrated. The problem of low light conversion efficiency caused by scattering of light due to the radiation of light from the light source to the disorder quantum dots in the prior art is avoided. Meanwhile, the thin film layer may have functions of water-oxygen isolating and high-temperature resistance. Consequently, on the basis of ensuring the light conversion efficiency, the light conversion film is brought to be closer to the back-light module. Further, a more compact liquid crystal display module may be prepared, and hence, a more compact display device may be prepared, and the service life of the liquid crystal display device may be improved.

Finally, it is to be noted that, the above embodiments are merely provided for illustrating the technical solutions of the present disclosure, but not for limiting the present disclosure. Although the present disclosure has been described in detail in combination with the above embodiments, it should be understood by a person skilled in the art that the technical solutions recorded in the above embodiments may be modified or some or all of technical features thereof may be equivalently replaced, and those modifications or replacements will not cause the essence of the corresponding technical solutions to depart from the scope of the technical solutions of the embodiments of the present disclosure.

What is claimed is:

1. A light conversion film, comprising: a first substrate, a thin film layer, a quantum dot layer in which quantum dots are distributed, and a second substrate, which are all successively stacked,
   wherein said thin film layer is a transparent sheet having an electric field on a surface thereof, and said quantum dots are orderly arrayed due to said electric field, and
   wherein said thin film layer has charged ions on at least one side thereof, and each quantum dot has ligands having a polarity and a core.

2. The light conversion film according to claim 1, wherein said thin film layer is made of muscovite sheets, potassium chloride sheets or phlogopite sheets.

3. The light conversion film according to claim 1, wherein said thin film layer is made by a lift-off process.

4. The light conversion film according to claim 1, wherein said thin film layer has a micron-level thickness.

5. The light conversion film according to claim 4, wherein said thin film layer is a flexible thin film layer.

6. The light conversion film according to claim 1, wherein said light conversion film further comprises:
   a first water-oxygen isolating layer located between said quantum dot layer and said second substrate.

7. The light conversion film according to claim 6, wherein said light conversion film further comprises a second water-oxygen isolating layer located between said thin film layer and said first substrate.

8. A method for preparing the light conversion film according to claim 1, comprising:
attaching the thin film layer on a surface of the first substrate;
coating quantum dot material on said thin film layer to form the quantum dot layer; and
adhering the second substrate on a surface of said quantum dot layer.

9. The method according to claim 8, wherein said thin film layer is made of muscovite sheets, and
the attaching step comprises:
slicing muscovite to obtain the muscovite sheets, and then attaching the muscovite sheets on a surface of said first substrate.

10. The method according to claim 8, wherein said thin film layer has a micron-level thickness.

11. The method according to claim 8, wherein the adhering step comprises:
successively adhering a first water-oxygen isolating layer and said second substrate on a surface of said quantum dot layer.

12. The method according to claim 11, wherein the attaching step comprises:
successively attaching a second water-oxygen isolating layer and said thin film layer on the surface of said first substrate.

13. A liquid crystal display device, comprising a liquid crystal display module comprising a liquid crystal panel, a light conversion film and a light source, which are all successively stacked;
wherein said light conversion film comprises a first substrate, a thin film layer, a quantum dot layer in which quantum dots are distributed, and a second substrate, which are all successively stacked; wherein said thin film layer is a transparent sheet having an electric field on a surface thereof, and said quantum dots are orderly arrayed due to said electric field;
wherein said thin film layer has charged ions on at least one side thereof, and each quantum dot has ligands having a polarity and a core; and
wherein said light conversion film is located between said liquid crystal panel and said light source, and a distance from said thin film layer to said light source is less than a distance from said quantum dot layer to said light source.

14. The liquid crystal display device according to claim 13, wherein said liquid crystal display module further comprises:
a reflecting plate and a light guide plate which are stacked, wherein said light source is arranged on a side face of said light guide plate, said light conversion film is located between said light guide plate and said liquid crystal panel, and a distance from said light guide plate to said light conversion film is less than a distance from said reflecting plate to said light conversion film.

15. The liquid crystal display device according to claim 13, wherein said liquid crystal display module further comprises:
a brightness enhancement film arranged between said liquid crystal panel and said light conversion film.

16. The liquid crystal display device according to claim 13, wherein said thin film layer is made of muscovite sheets, potassium chloride sheets or phlogopite sheets.

17. The liquid crystal display device according to claim 13, wherein said thin film layer is made by a lift-off process.

18. The liquid crystal display device according to claim 13, wherein said thin film layer has a micron-level thickness.

19. The liquid crystal display device according to claim 13, wherein said light conversion film further comprises:
a first water-oxygen isolating layer located between said quantum dot layer and said second substrate.

20. The liquid crystal display device according to claim 19, wherein said light conversion film further comprises a second water-oxygen isolating layer located between said thin film layer and said first substrate.

* * * * *

UNITED STATES PATENT AND TRADEMARK OFFICE
CERTIFICATE OF CORRECTION

| | | |
|---|---|---|
| PATENT NO. | : 10,101,520 B2 | Page 1 of 1 |
| APPLICATION NO. | : 15/090038 | |
| DATED | : October 16, 2018 | |
| INVENTOR(S) | : Xuhai Liu et al. | |

It is certified that error appears in the above-identified patent and that said Letters Patent is hereby corrected as shown below:

On the Title Page

Column 1, replace current item (73) with the one below:
(73) Assignee(s):
--HISENSE USA CORP., Suwanee, GA (US)--.

Signed and Sealed this
Twentieth Day of September, 2022

Katherine Kelly Vidal
*Director of the United States Patent and Trademark Office*